(12) United States Patent
Robertson

(10) Patent No.: US 7,270,372 B2
(45) Date of Patent: Sep. 18, 2007

(54) INFANT CARRIER FRAME

(76) Inventor: Maria R. Robertson, 275 Bamberg Dr., Bluffton, SC (US) 29910

( * ) Notice: Subject to any disclaimer, the term of this patent is extended or adjusted under 35 U.S.C. 154(b) by 11 days.

(21) Appl. No.: 11/064,935

(22) Filed: Feb. 25, 2005

(65) Prior Publication Data

US 2005/0189797 A1 Sep. 1, 2005

Related U.S. Application Data

(60) Provisional application No. 60/548,112, filed on Feb. 27, 2004.

(51) Int. Cl.
*A47C 31/00* (2006.01)
*A47C 4/52* (2006.01)
*A47D 1/00* (2006.01)

(52) U.S. Cl. .............. 297/183.6; 297/219.12; 297/250.1

(58) Field of Classification Search ............. 297/183.1, 297/183.7, 183.6, 250.1, 219.12
See application file for complete search history.

(56) References Cited

U.S. PATENT DOCUMENTS

| | | | |
|---|---|---|---|
| 3,596,986 A | 8/1971 | Ragsdale | |
| 3,841,543 A | 10/1974 | Bolton | |
| 4,516,806 A * | 5/1985 | McDonald et al. | 297/452.13 |
| 4,717,056 A | 1/1988 | Carmichael | |
| 4,730,759 A | 3/1988 | Naidu | |
| 5,201,535 A | 4/1993 | Kato et al. | |
| 5,207,476 A | 5/1993 | Payne | |
| 5,224,229 A | 7/1993 | Smith | |
| 5,267,680 A | 12/1993 | Torok | |
| 5,277,472 A | 1/1994 | Freese et al. | |
| 5,333,769 A | 8/1994 | Skroski | |
| 5,366,271 A * | 11/1994 | Johnston et al. | 297/250.1 |
| D361,743 S * | 8/1995 | Matsumoto et al. | D12/129 |
| 5,468,047 A | 11/1995 | Goor et al. | |
| 5,540,365 A | 7/1996 | LaMair | |
| 5,651,581 A * | 7/1997 | Myers et al. | 297/183.6 |
| 5,775,770 A | 7/1998 | Tunney | |
| 5,806,924 A | 9/1998 | Gonas | |
| 5,842,737 A * | 12/1998 | Goor | 297/216.11 |
| 6,354,475 B1 | 3/2002 | Grace et al. | |
| 6,378,746 B1 | 4/2002 | Miller | |
| 6,378,937 B1 | 4/2002 | Faudman | |
| 6,390,555 B2 | 5/2002 | Wilkins et al. | |
| 6,685,266 B2 * | 2/2004 | James et al. | 297/250.1 |
| 6,773,065 B1 * | 8/2004 | Stamper | 297/256.12 |
| 6,811,216 B2 * | 11/2004 | Sedlack | 297/250.1 |
| 2002/0117520 A1 | 8/2002 | Chen et al. | |
| 2003/0015896 A1 | 1/2003 | Geis et al. | |
| 2003/0106916 A1 | 6/2003 | Boone | |

FOREIGN PATENT DOCUMENTS

GB   2 167 657 A   6/1986

* cited by examiner

*Primary Examiner*—David Dunn
*Assistant Examiner*—Tania Abraham
(74) *Attorney, Agent, or Firm*—Richard C. Litman

(57) ABSTRACT

The infant carrier frame provides additional comfortable lifting points and a contoured shape facilitating easier holding or carrying. Handles are included at the sides, the head end, and the foot end to provide options to enable easier lifting, holding, and carrying in the varying day-to-day circumstances typical of moving an infant around in an infant carrier. The sides of the frame each are formed with an inwardly curved recess. The outside of the recessed section of the frame is padded with a soft cushion material having a textured surface to increase gripping traction.

9 Claims, 3 Drawing Sheets

INFANT CARRIER FRAME

CROSS-REFERENCE TO RELATED APPLICATION

This application claims the benefit of U.S. Provisional Patent Application Ser. No. 60/548,112, filed Feb. 27, 2004.

BACKGROUND OF THE INVENTION

1. Field of the Invention

The present invention relates to infant car seats, and more particularly to an ergonomically designed frame for the infant carrier portion of infant car seats, and to an infant car seat incorporating the frame.

2. Description of the Related Art

The infant car seat market is a saturated market. However, many of the improvements therein relating to increasing the manageability of the infant carrier portion have been limited to solutions for functional problems and weight displacement. Unfortunately, such efforts do not focus on other means of increasing the comfort of the parent or caregiver who lifts, holds or carries the infant carrier. While such devices as shoulder straps and differently shaped handles may help to some degree, general weight displacement solutions ignore some of the more glaring sources of parent or caregiver discomfort.

The handle provided with currently available car seats requires that a person carrying the car seat by the handle maintain his or her wrist in a twisted position with the palm of the hand facing either forward or backward and the weight of the carrier below the hips, which can be uncomfortable when transporting the car seat for any extended distance. Regardless of how the weight is displaced or whether the hand is turned inward or outward while carrying the infant carrier, hard fins or protrusions of the plastic frame pressing into the side or leg of the person carrying the infant carrier cause a significant amount of discomfort. The myriad assortment of handle and strap variations available do little to address this common problem. Few are strong enough to carry the infant carrier with an infant aboard in such a way so that the frame of the car seat does not rest upon her or his body at some point, typically the side or leg.

Also, often the parent or caregiver will not utilize the available lifting means at all when lifting the infant carrier out from its base in the automobile or simply from a resting position elsewhere. She or he will frequently instead grasp another section of the frame and support the weight on the hip. The relatively sharp and rigid edges of the carrier make this position relatively uncomfortable, except for short distances. For example, due to the relatively low roof in many cars the typical U-bar handle extending directly upward above the car seat is not practical for the task of lifting the infant carrier out of the base. The job is accomplished much more easily grasping the top and bottom of the infant carrier, or in some circumstances, the two sides.

While these sections may be the optimal gripping points for lifting, holding or carrying in certain situations, currently most infant carriers are not designed to better facilitate such options. Consequently, the parent or caregiver must grasp hard plastic frames that dig into their hands and sides as they lift, hold, or carry the car seat. Hence, there is a need for a special infant carrier frame designed addressing all of the above listed problems.

U.S. Pat. No. 6,354,475, issued Mar. 12, 2002 to Grace et al., discloses an infant carrier for holding an infant while walking. The infant carrier features contoured sides and a lengthwise-aligned U-bar type handle. U.S. Patent Publication No. 2003/0015896, published Jan. 23, 2003, describes an infant seat for holding an infant while walking. The infant seat includes small pads at various locations, such as beneath the handle and on the sidewall, to increase the comfort of the one carrying the invention.

U.S. Pat. No. 5,277,472, issued Jan. 11, 1994 to Freese et al., discloses an infant car seat with a removable infant carrier section. The base of the seat remains attached to the automobile seat. The car seat also features hand slots in addition to the handle.

Other patents in the field of infant car seats and carriers include U.S. Pat. No. 5,207,476, issued May 4, 1993 to T. H. Payne (infant seat with longitudinally-oriented handle); U.S. Pat. No. 6,378,937, issued Apr. 30, 2002 to D. A. Faudman (retractable infant-seat shoulder strap); U.S. Pat. No. 5,540,365, issued Jul. 30, 1996 to M. E. LaMair (strap suspension system for infant car seat) and U.S. Patent Publication No. 2002/0117520, published Aug. 29, 2002 (portable infant carrier including a mattress pad and a pivotally mounted plate).

None of the above inventions and patents is seen to describe the instant invention as claimed. Thus, an infant carrier frame solving the aforementioned problems is desired.

SUMMARY OF THE INVENTION

The infant carrier frame provides additional comfortable lifting points and a contoured shape facilitating easier holding or carrying. Handles are included at the sides, the head end, and the foot end to provide options to enable easier lifting, holding, and carrying in the varying day-to-day circumstances typical of moving an infant around in an infant carrier. The sides of the frame each contain an inwardly curved recess. The outside of the recessed section of the frame is padded with a soft cushion material having a textured surface to increase gripping traction.

Hence, the infant carrier frame and an infant car seat incorporating the frame provide the busy caregiver with more convenient options for lifting the carrier, and make the carrier more comfortable to carry against the hip or flank. These features will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an infant carrier frame for use in an infant car seat, and extends to a car seat incorporating the frame. It should be understood that the invention is intended for application in a general infant carrier car seat design and not for any particular model thereof. It should further be understood that the generic term "car seat" includes a device that satisfies federally mandated and regulated safety standards for infant car seats. Such features and aspects of the device applicable to meeting those requirements, such as securing means, weight, impact standards, safety belt restraints, and the like will not be described in detail in this description, as such issues are not pertinent to the present invention. Also, it should be noted that the general aspects of an infant carrier well known in the art, such as general shape and function, need not be described in detail, except as to those aspects that differ from the conventional forms currently in extensive use in the art. Such aspects will be made clear below.

Figure 1:
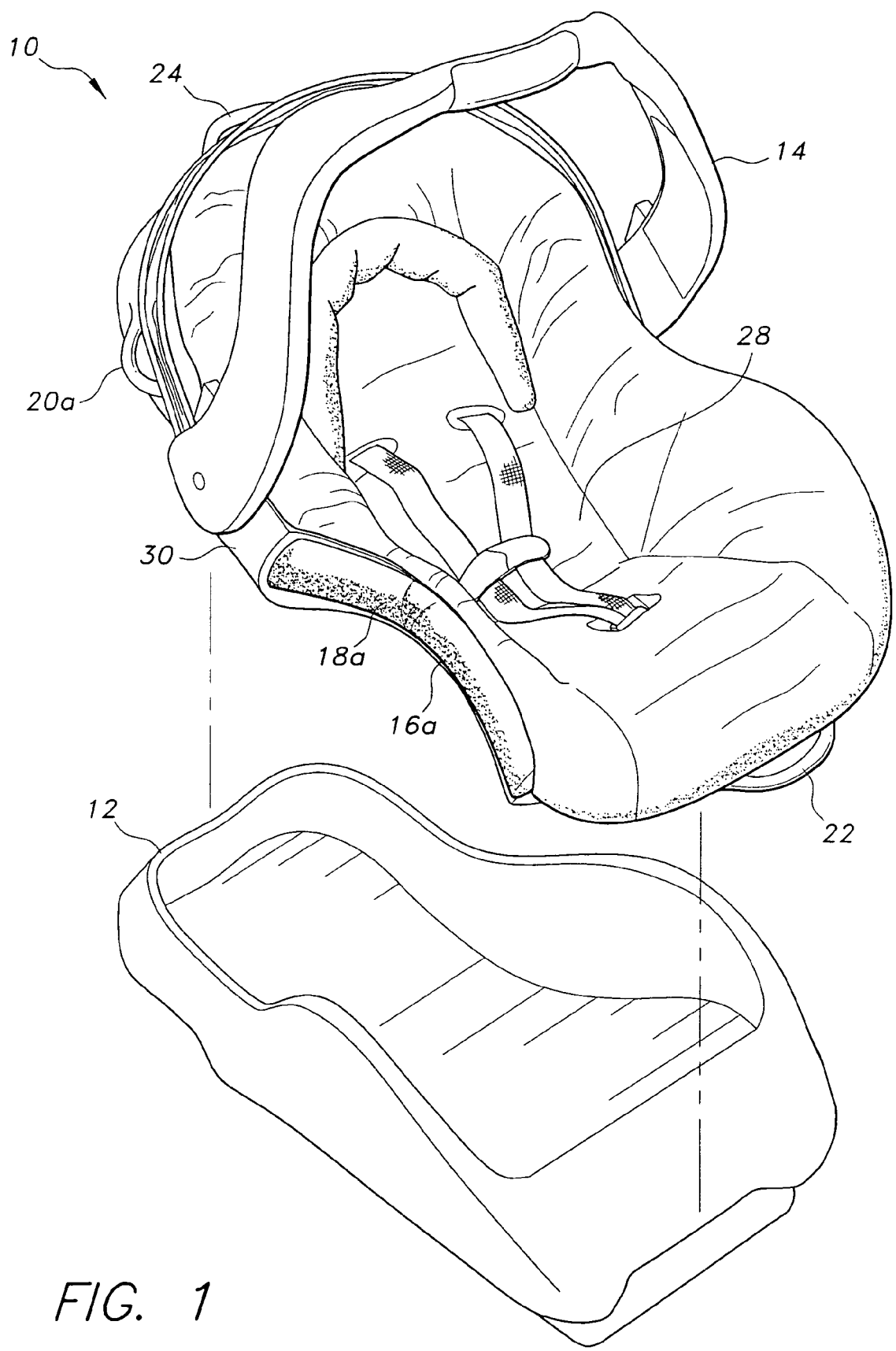
FIG. 1 is a perspective view of an improved infant carrier according to the present invention, detached from a base.
Figure 2:
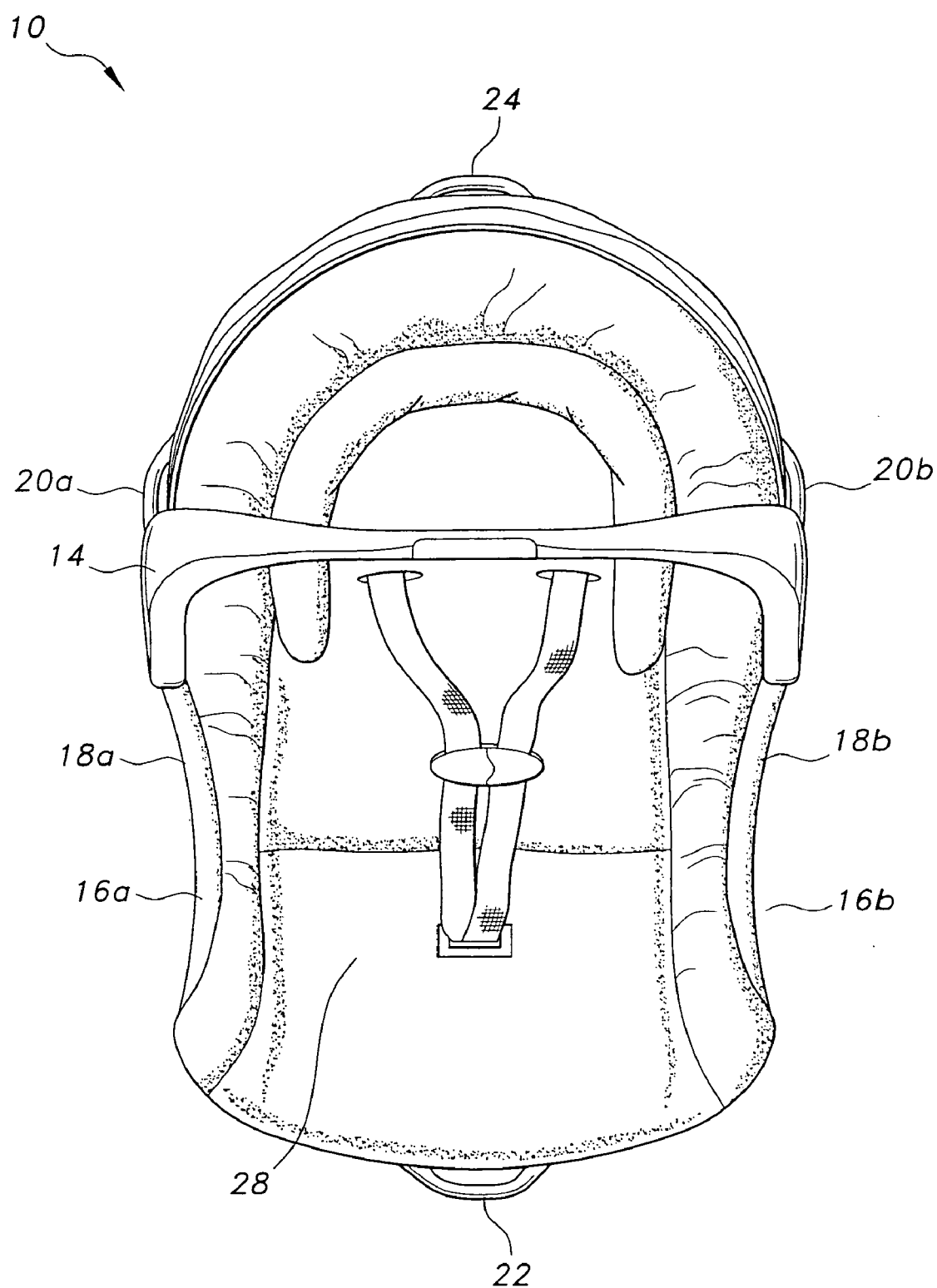
FIG. 2 is a top view of an improved infant carrier according to the present invention.
Figure 3:
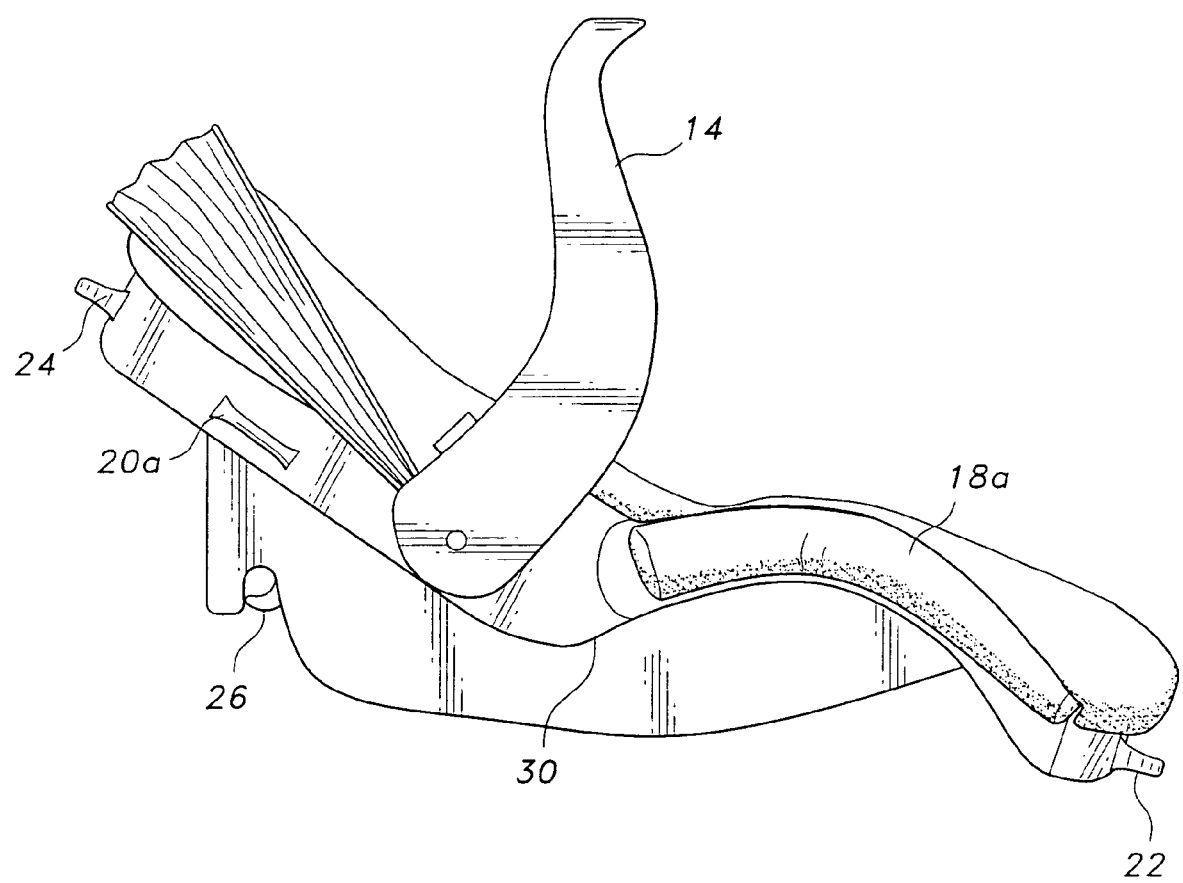
FIG. 3 is a side view of an improved infant carrier according to the present invention.

Referring to FIGS. 1-3, a preferred embodiment of a representative infant carrier car seat includes the infant carrier frame 10 having a handle 14 pivotally attached to a shell 30 and having a detachable base 12. In use, the base 12 is secured to the automobile (not shown) by a conventional latch 26 and remains within the automobile (not shown) when removing the infant carrier frame 10 while transporting the infant from place to place. The handle 14 as a single option is often not enough to comfortably satisfy the transporting needs of a parent or caregiver. The infant carrier shell 30, therefore, includes additional side handles 20a and 20b, a bottom handle 22 at the foot end of the shell 30, and a top handle 24 positioned at the head end of the shell 30. These extra handles 20a, 20b, 22, and 24 are instrumental in providing parents and caregivers a number of options in lifting, holding and carrying the infant carrier frame 10. Instead of being left with no choice but to grasp hard, occasionally sharp, plastic edges and protrusions, risking injury to self or damage to the infant carrier, the parent or caregiver is provided with comfortable, ergonomically designed handles at common lifting and holding points. Preferably, at a minimum, at least one handle should be situated at the head end of the shell 30 near where the infant's head would lie, as is handle 24, at least one should be situated at the foot end of the shell 30 near where the infant's feet would lie, as is handle 22, and at least one should be placed on either side, as are handles 20a and 20b. FIG. 2 shows a preferable central alignment placement for top and bottom handles 24 and 22 respectively. FIG. 3 shows a preferable location on the upper portion of the shell 30 for the side handles 20a and 20b by the placement of side handle 20a.

The precise type of the handles 20a, 20b, 22, and 24 is not critical. Preferably, the handles 20a, 20b, 22, and 24 will be molded into the shell 30, as illustrated in FIG. 2, but any conventional type of handle may be used, including, but not limited to, handles that fold down or up to snap into place, or handles that slide in and out to snap into place.

Still referring to FIG. 2, the shell 30 includes contoured recess side sections, 16a and 16b. These side sections 16a and 16b curve inward toward the interior space 28 of the infant carrier 10 to increase the comfort of the parent or caregiver as the infant carrier frame 10 rests upon her or his hip, side, or leg while it is carried. The contoured recess side sections 16a and 16b also include additional cushioning pads 18a and 18b lining the outside of the side sections 16a and 16b, opposite the interior 28 of the infant carrier frame 10. Preferably, the cushioning pads 18a and 18b will be constructed of a soft material encased in a textured fabric that provides increased traction so as to aid in the prevention of slipping should the parent or caregiver decide to carry the infant carrier in a laundry-basket fashion, reaching across to grip one of the side handles 20a or 20b while resting the infant carrier frame 10 against her or his hip.

In combination, the specially shaped shell 30, gripping cushion pads 18a and 18b, and additional handles 20a, 20b, 22 and 24 maximize comfort in various optional lifting, carrying and holding positions commonly used by parents and caregivers. It is to be understood that the present invention is not limited to the embodiments described above, but encompasses any and all embodiments within the scope of the following claims.

I claim:

1. An infant carrier frame for an infant car seat, comprising:
    an infant carrier shell having a head end, a foot end, an outer peripheral surface constituting the infant carrier shell, two opposing sides formed on said outer peripheral surface adjacent said foot end, and a padded interior section disposed between the head end, the foot end, and the opposing sides adapted for receiving an infant, each of the two opposing sides having a contoured recess section defined therein curving substantially horizontally inward toward the interior section of the shell;
    a layer of cushion padding attached only to the contoured recess sections;
    a first handle extending from the head end of the shell;
    a second handle extending from the foot end of the shell;
    a third handle and a fourth handle extending from the two opposing sides of the shell; and
    a carrier handle pivotally mounted on the shell and located adjacent the head end, whereby the contoured recess sections are located between the carrier handle and the foot end.

2. The infant carrier frame according to claim 1, wherein the layer of cushion padding is made from a textured fabric.

3. An infant car seat, comprising:
    a base adapted for attachment to an automobile seat; and
    an infant carrier frame removably attached to the base, the frame having:
    an infant carrier shell having a head end, a foot end, an outer peripheral surface constituting the infant carrier shell, two opposing sides formed on said outer peripheral surface adjacent said foot end, and a padded interior section disposed between the head end, the foot end, and the opposing sides adapted for receiving an infant, each of the two opposing sides having a contoured recess section defined therein curving substantially horizontally inward toward the interior section of the shell;
    a layer of cushion padding attached only to the contoured recess sections;
    a first handle extending from the head end of the shell;
    a second handle extending from the foot end of the shell;
    a third handle and a fourth handle extending from the two opposing sides of the shell; and
    a carrier handle pivotally mounted on the shell and located adjacent the head end, whereby the contoured recess sections are located between the carrier handle and the foot end.

4. The infant carrier frame according to claim 3, wherein the layer of cushion padding is made from a textured fabric.

5. An infant carrier frame for an infant car seat, comprising:
    an infant carrier shell having a head end, a foot end, an outer peripheral surface constituting the infant carrier shell, two opposing sides formed on said outer peripheral surface adjacent said foot end, and a padded interior section disposed between the head end, the foot end, and the opposing sides adapted for receiving an infant, each of the two opposing sides having a contoured recess section defined therein curving substantially horizontally inward toward the interior section of the shell, a layer of cushion padding attached only to the contoured recess sections;

at least two handles extending from the shell; and a carrier handle pivotally mounted on the shell and located adjacent the head end, whereby the contoured recess sections are located between the carrier handle and the foot end.

6. The infant carrier frame according to claim 5, wherein the cushion padding is made from a textured fabric.

7. The infant carrier frame according to claim 5, wherein said at least two handles includes a first handle extending from the head end of the shell.

8. The infant carrier frame according to claim 7, wherein said at least two handles includes a second handle extending from the foot end of the shell.

9. The infant carrier frame according to claim 5, further comprising a third handle and a fourth handle extending from the two opposing sides of the shell.

* * * * *